Aug. 6, 1968 — A. MENDALOFF, JR — 3,395,545
CABLE-LAYING APPARATUS
Filed Feb. 15, 1966 — 2 Sheets-Sheet 1
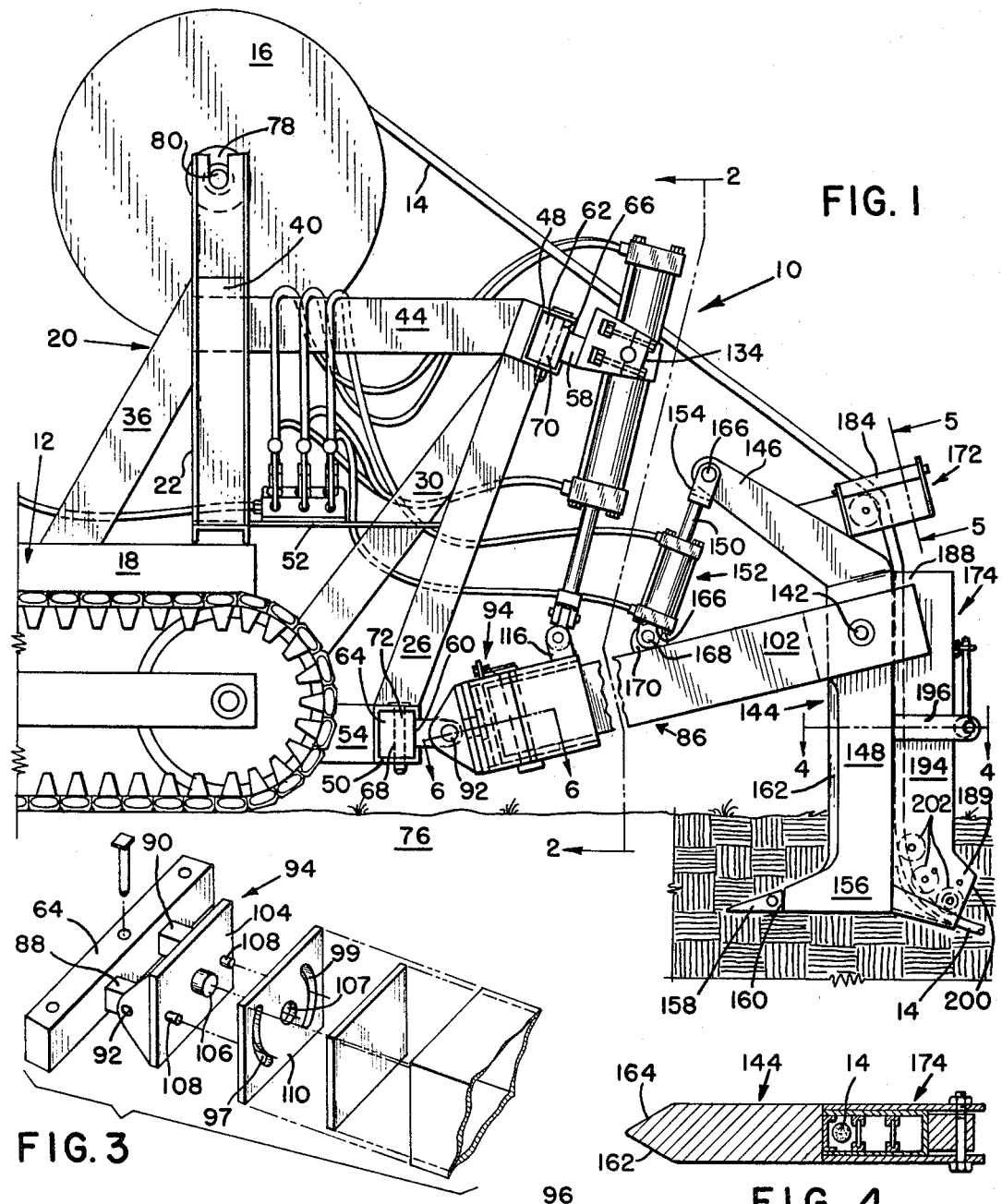
INVENTOR.
ALEXANDER MENDALOFF JR.

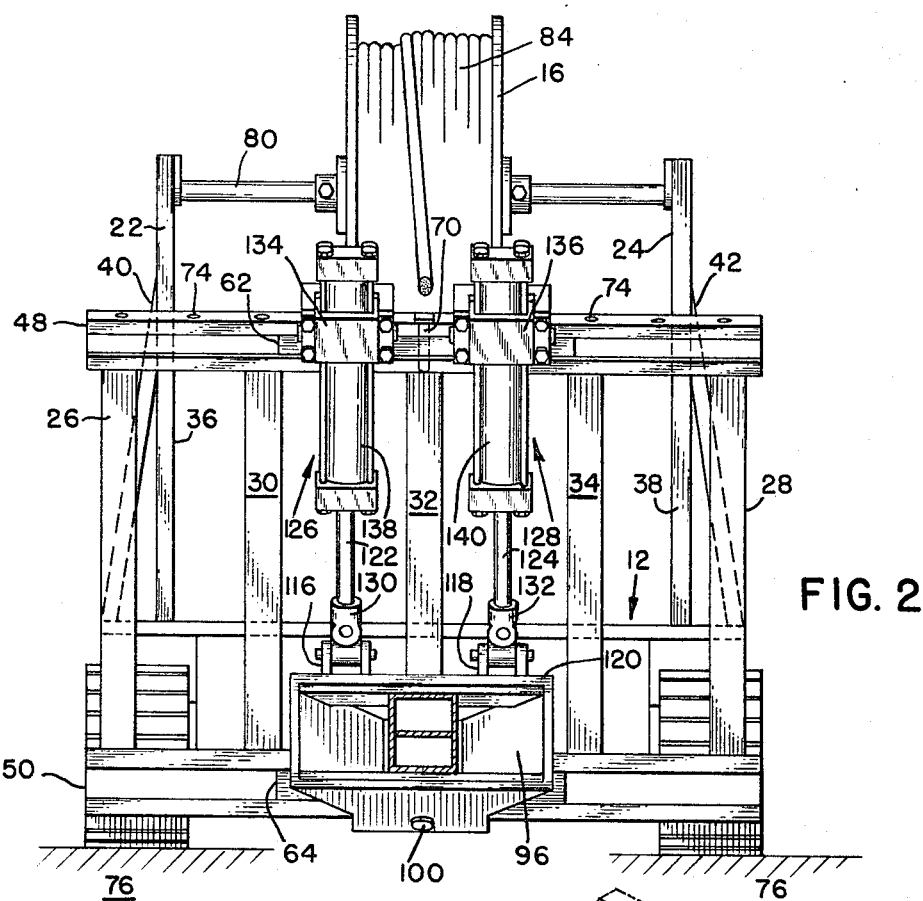
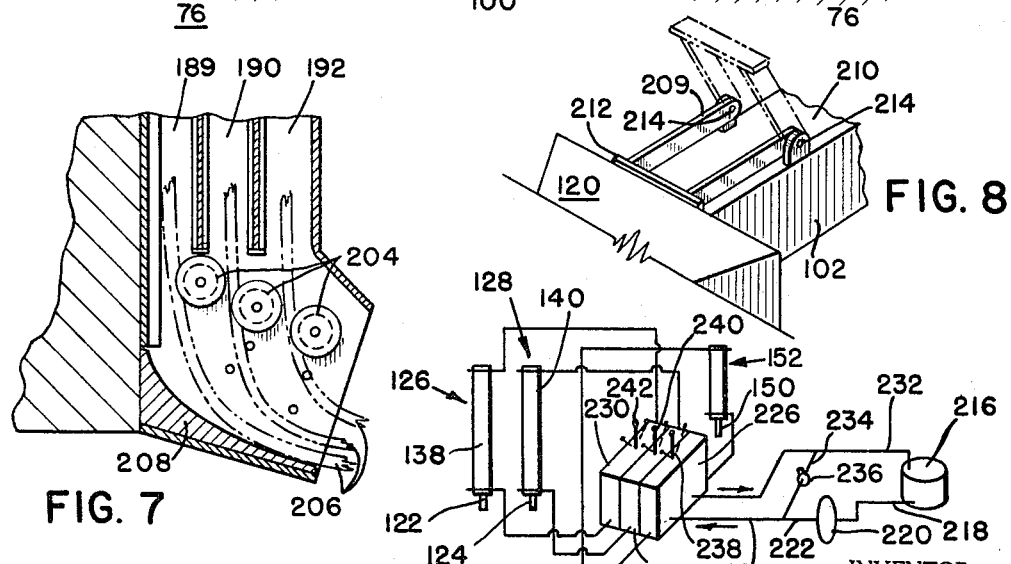

United States Patent Office 3,395,545
Patented Aug. 6, 1968

3,395,545
CABLE-LAYING APPARATUS
Alexander Mendaloff, Jr., 334 S. Race St.,
Statesville, N.C. 28677
Filed Feb. 15, 1966, Ser. No. 527,678
10 Claims. (Cl. 61—72.6)

ABSTRACT OF THE DISCLOSURE

Apparatus for opening the ground and burying or installing telephone or other electrical cables, plastic water lines, conduits and like materials for attachment to a tractor or a self-powered vehicle having a slidably and pivotally movable plow shank cooperating with the frame and cable supply to lay cable and the like several feet below the surface of the earth.

---

This invention relates generally to machines for opening the ground and burying or installing telephone or other electrical cables, plastic waterlines, conduits, and in particular to an attachment for a tractor or self-powered vehicle which can be positioned by a plurality of prime movers to accurately lay cable and the like several feet below the surface of the earth.

For esthetic and long-term economic reasons, it has become increasingly desirable and advantageous to lay or bury electrical conductors and the like below the earth's surface rather than stringing them on poles. Since a conductor or cable, once laid below the earth's surface, cannot be seen by the eye, it is very important that it be positioned accurately so that it can be easily found in case repair is necessary and in case future earth-moving operators work in the same area and need to know its location in order to avoid it.

Various types of cable-laying machines and attachments are known, and although such devices make it possible to lay cable, conduit and the like, the cable-laying shoe or plow which actually forms the trench or furrow is rigidly mounted on the center of the machine thus requiring that the tractor or vehicle be held on a true course and thereby eliminating the freedom of movement resulting from a floating shoe. With the limitations of existing machines and the floating shoe principle in mind, the present inventive concept contemplates a cable-laying apparatus having a plow shank carrying a soil-turning shoe suspended from a carriage in a pivotal arrangement whereby the shoe is free to swing laterally to compensate for lateral movements of the towing tractor or vehicle. This objective is obtained generally by designing the plow to act as a rudder below the earth's surface so that the vehicle operator may set his tractor wheels or tracks at equal speeds and merely maintain the vehicle in a general direction commensurate with the angular deflection of the cable-laying plow.

The present device is constructed so that a tractor operator and a helper may readily lay hundreds of feet of cable per day in an exact prescribed path and at the desired depth. The present cable-laying attachment in conjunction with a power driven vehicle is so constructed that it can lay cable or flexible conduit within a central path over which the vehicle moves, or to either side thereof, thereby enabling the cable to be laid in close proximty to fences, walls or the like, where other cable-laying devices could not function effectively.

With the above in mind, it is therefore an object of this invention to provide a tractor or vehicle mounted, cable-laying attachment which is readily maneuverable to lay cable within a path over which the vehicle moves, or to either side thereof.

A further object of this invention is to provide a means whereby a cable-laying plow may be accurately maintained in its designated course without burdensome and difficult operator maneuvers.

Another object of this invention is to provide a novel framing and hydraulic apparatus which permits the cable-laying plow to be maneuvered in such a manner that the blade maneuvers the vehicle rather than the vehicle maneuvering the blade.

A further object of this invention is to provide cable-laying equipment which will lay cable in difficult terrain and conditions with accuracy and speed heretofore unattainable.

Yet another object of the invention is to provide a cable-laying attachment for a power-driven vehicle which is hydraulically controlled so that the operator may control the operation of the attachment simultaneously and cooperatively with the control of the operation of the vehicle.

Still another object of the invention is to provide an apparatus which will direct a cable or flexible conduit into a ditch or furrow formed by the plow of the cable-laying attachment in such a manner that the cable or flexible conduit will be placed thereinto without kinking or distortion.

Yet still another object of the invention is to provide a cable-laying attachment for a tractor or vehicle which may be manipulated by the operator to define a path independent of the path over which the tractor travels.

A still further object of the invention is to provide a cable-laying attachment with a plow, the pull of which attachment is directed to the vehicle at a point below the center of gravity, so as to maintain the vehicle stable during the pulling of the plow through the earth.

Other objects and many of the attendant advantages of this novel cable-laying apparatus will become more readily apparent from the following detailed description taken in conjunction with the accompanying drawings in which like characters of reference designate corresponding parts throughout the several views, and wherein:

FIG. 1 is a side elevational view of the framework of the cable-laying apparatus showing the first frame member secured to the self-powered vehicle or tractor and the second frame member movably connected thereto and supporting hingedly the plow shank and formed earth-engaging shoe;

FIG. 2 is an end view of the cable-laying apparatus showing the vertically disposed fluid-driven double-acting cylinders that move the second frame member with respect to the first frame member secured to the power-driven vehicle and also illustrating the positioning of a wound supply of cable or conduit to the first and second frame members;

FIG. 3 is a perspective, exploded, sectional and slightly enlarged view of the freely pivotal or universal junction between the first frame member and the second frame member of the present invention particularly pointing out the arcuate slots and shaft recess that allow shearing or rotational motion between the respective frame members;

FIG. 4 is an enlarged cross-sectional view of the plow shank taken substantially on the plane indicated by the line 4—4 of FIG. 1;

FIG. 5 is an enlarged cross-sectional view of the idler and cable directing mechanism taken substantially on the plane indicated by the line 5—5 of FIG. 1;

FIG. 6 is an enlarged cross-sectional view of the junction mechanism connecting the first frame member with the second frame member taken substantially on the plane indicated by the line 6—6 of FIG. 1;

FIG. 7 is a greatly enlarged, sectional and fragmentary view of the cable bending apparatus located proximate the ground-engaging end of the plow shank and rearwardly from the soil-engaging shoe;

FIG. 8 is a perspective, fragmentary view of the second frame member boom locking mechanism which is utilized to prevent free movement of that member during the transporting of the cable-laying apparatus from one work location to another and which is disengaged when the apparatus is in use so as to allow the boom or second frame member to swing freely and act as a rudder while the driving vehicle advances and cable or conduit is laid in the produced ditch or furrow, and FIG. 9 is a diagrammatic view of the hydraulic system used in the preferred embodiment of this invention.

Referring to the drawings and more particularly to FIG. 1, there is shown a side elevational view of one embodiment of the present inventive concept of a cable-laying apparatus generally designated 10 which uses as a base or supporting structure, a self-powered vehicle or tractor 12 which can easily transport a supply of wound wire, conduit or the like, such as generally designated 14, by means of a reel or drum 16 suspended thereon so that cable may be laid simultaneously as a trench or furrow (not shown) is formed. Secured directly to the tractor structure 18 is a first frame member generally designated 20 which comprises upstanding and substantially vertical supporting struts 22, 24, 26, 28, 30, 32 and 34 along with a number of angularly positioned supporting braces 36, 38, 40 and 42. A plurality of horizontal support members 44, 46, 48 and 50 rigidly secure the upstanding members with respect to the vehicle 12 and with respect to each other in a spaced-apart manner. Additionally, a platform 52 offers structural support and makes available a place for situating the operating controls for the various hydraulic cylinders which will be subsequently described in detail. Additional frame members 54 and 56 secure first frame member 20 to the body of tractor or vehicle 12.

Members 48 and 50 form retaining channels which face or open 58 and 60 rearwardly of the vehicle or tractor 12 and are constructed to slidably receive frame connecting members 62 and 64 so that the attached second frame member which will be described subsequently can move slidably and laterally with respect to the first frame member 20. Connecting members 62 and 64 have apertures 66 and 68 to accommodate pins 70 and 72 to lock members 62 and 64 in a secure position with respect to horizontal members 48 and 50 and preclude any lateral movement of those members within the retaining channels 48 and 50. Additionally, channels 48 and 50 have a number of pin-receiving recesses 74 that align with recesses 66 and 68 so that pins 70 and 72 may be inserted to secure the connecting members 62 and 64 from relative movement with respect to the first frame member 20.

Upstanding members 22 and 24 extend to the highest position from the ground 76 and have receiving slots 78 formed within their upper ends to accommodate a supporting shaft 80 which in turn maintains a reel or drum 16 or a wound supply 84 of cable, conduit or the like. Shaft 80 and its carried material may be expenditiously removed and replaced when the wound supply 84 is exhausted or when a change in cable or conduit size is desired, merely by lifting the shaft and carried materials vertically by a crane, hoist or like apparatus, or manually in the event the cable or conduit supply is exhausted and the remaining materials consist of only the shaft 80 and the reel 16.

A second frame member generally designated 86 consists of connectors 88 and 90 secured to member 64 which serve to pivotally connect at pivot point 92 connecting member 64 with the pivotal junction or universal joint generally designated 94. A funnel 96 is integrally formed with the universal joint 94, and within the opening 98 there is pivotally secured by pin 100 a boom 102 which extends outwardly from funnel 96 through opening 98 and rearwardly of vehicle 12. The position of connecting member 64 within recess 50 allows the second frame member 86 and its components to be slidably movable laterally with respect to first frame member 20 since the removal of pin 72 allows members 64 to shift within channel 50 when such a displacement is desired. This operation can be done manually or, as will be more specifically described subsequently, somewhat automatically by the cooperative use of the fluid-actuated double-acting cylinders.

The freely pivotal junction or universal joint 94 is comprised essentially of a stud-bearing surface 104 maintained and aligned by pivot shaft 106 along with guide pins 108 which maintain boom 102 in registry as it rotates with respect to member 64 about pin 106. A slotted plate 110 is made integral with the plate structure 112 forming a portion of funnel 96, and the slots 97 and 99 along with aperture 107 serve to cooperatively receive stud 106 and pins 108 so as to guide and control the relative movement between second frame member 86 and first frame member 20. A cap 114 maintains the slotted plate 110 and its associated funnel structure 112 in a fixed relationship with stud-bearing surface 104 and its associated structure including member 64 that is held within channel 50 by pin 52. Boom 102 is freely movable about pivot point 100 within funnel 96 when in the operable position, and the function of this freely movable member will be described subsequently in conjunction with the operation of the cable-laying apparatus.

A pair of collars 116 and 118 are secured to the upper surface 120 of funnel 96 and serve to support the exposed piston rods 122 and 124 of the fluid-actuated cylinders generally designated 126 and 128. Universal joints 130 and 132 allow maximum movement of rods 122 and 124 with respect to collars 116 and 118 and their supporting surface 120. A pair of clamping devices 134 are secured to connecting member 62 and engulf the body portions 138 and 140 of cylinders 126 and 128 so as to maintain those cylinders in substantially vertical and parallel position such as that generally shown in FIG. 2 of the drawings. Thus when it is desirable to move boom 102 laterally with respect to first frame member 20, pin 70 will also be removed so as to allow member 62 to slide simultaneously with member 64 and thus have pistons 126 and 128 shifted therewith.

Pivotally connected at a point 142 located rearwardly of boom 102 is a plow shaft or shank generally designated 144 which may be integrally fashioned or formed from a plurality of sections. Shank 144 is substantially maintained in a generally vertical position and has its upper end 146 angled from the main shaft portion 148 so as to extend forwardly toward vehicle 12 and substantially over boom 102 to provide a convenient connection for the piston rod 150 of a single hydraulic cylinder generally designated 152. A clamp or coupler 154 and pin 166 hold the coupling device movably against the upper end 146. Shank 144 extends downwardly to a lower soil-engaging end 156 which has a replaceable bore or tip 158 at a forward edge 160 so as to make it somewhat easier to part the earth and form a furrow or trench therein as the vehicle 12 advances. The tip 158 along with the adjoining section 156 of shank 144 form a soil-opening shoe for use in operation of the cable-laying apparatus. Additionally, the middle portion 148 of shank 144 has tapered forward leading edges 162 and 164 to alleviate and assist in cleaving or cutting the ground as the tractor or vehicle advances and a trench or furrow is formed.

Cylinder 152 is connected at its other end 166 by a collar 168 to an extrusion 170 formed along the upper edge of boom 102. The operation of shank 144 with respect to boom 102 and the remainder of the cable-laying apparatus in conjunction with the actuation of cylinder 152 will be explained in detail subsequently.

A number of guide members 172 and 174 are selectively positioned rearwardly of shank 144 to receive and direct cable, conduit, or the like from reel or drum 16 therethrough and position that material in the created trench or furrow. Guide 172 as particularly shown in FIG. 5 comprises a free spinning pulley or idler 176 held or supported by shaft 178 which is maintained in a horizontal position by side wall members 180 and 182. Additional freely spinning rollers 184 and 186 are cooperatively positioned above idler 176 so as to guide and direct cable or conduit 14. Actually rollers 184 and 186 allow second frame member 86 and its pivotally connected plow shank 144 to follow the consistent and direct pull of the cable 14 since these two connected structures will pivot freely about pivot pin 100 while the cable-laying apparatus is in operation.

Guide means 174 includes at least one enclosed cable-receiving channel 188, though as particularly pointed out in FIG. 7, a plurality of channels 188, 190 and 192 is more versatile and oftentimes much more advantageous. The enclosing structure 194 extends downwardly adjacent and substantially parallel to the middle portion 148 of shank 144, and a removable clamp 196 secures guide means 174 firmly thereto. At the lower trailing end 198 of guide means 174, there is an opening 200 from which cable or conduit 14 emerges as the vehicle 12 advances and the soil-opening shoe formed from burr 158 and lower end 156 of shank 144 forms a trench or furrow.

When a single cable or conduit 14 is to be laid within a single channel 188, a plurality of guide rollers 202 are selectively positioned within member 174 to rollably engage the cable or conduit 14 and arcuately bend that material as it is pulled through member 174 and emerges through opening 200 of channel 188. This allows the disposition of the cable or conduit 14 into the formed furrow in a substantially flat and kink-free position.

When the alternative embodiment illustrated in FIG. 7 utilizing a plurality of enclosed cable or conduit-receiving chambers 189, 190 and 192 is used, cable-engaging rollers 204 are selectively positioned within the total enclosure so as to individually engage the strands 206 of cable or conduit pulled therethrough. These rollers also act to arcuately shape the material passing thereagainst so as to remove all kinks and wrinkles and to allow that material to be disposed in a substantially flat position within the furrow or trench formed by the advancing tractor and carried apparatus 10. Additionally, it has been found advantageous to include an arcuately shaped solid member 208 within the alternative embodiment shown in FIG. 7 to assist in gently bending the cable passing through the plurality of channels 189, 190 and 192. The additional member 208 also provides structural strength that is needed when the additional stress of a plurality of cable or conduit strands 206 is experienced.

As has been previously discussed, when apparatus 10 is in operation, it is desirable to have boom 102 and its carried shank 144 in a freely movable state and particularly governed by pin 100 about which these structures are free to pivot. The cable-laying apparatus may be accurately maintained along a generally directed vehicular path of travel without burdensome and difficult operator maneuvers since a floating shoe is provided which will cause the plow to act as a rudder below the earth's surface so that the vehicle operator may simply set his tracks at equal speeds and maintain a general direction of travel.

When apparatus 10 is in the operative position, the boom locking member 209 is disengaged (see dotted outline). When it is then desired to transport the apparatus from one area of operation to another, the boom locking member 209 is folded forwardly and reclined substantially flat against the upper surface 210 of boom 102. The forward or leading edge 212 of member 209 then engages the upper top surface 120 of funnel 96 and thus precludes any pivotal movement of boom 102 about its pivot pin or point 100. Member 209 is pivotally held on the upper surface 210 of boom 102 by means of pins 214 or other conventional devices.

The absolute and relative motions of the various components of the cable-laying apparatus 10 are controlled by a hydraulic system which embodies a pair of substantially vertical positioned double-acting fluid actuated cylinders 126 and 128 which control pivotal, lateral and rotational movement of second frame member 86 with respect to first frame member 20, and a single fluid-actuated double-acting cylinder 152 which similarly controls the pivotal and relative movement of shank 144 with respect to second frame member 86 and particularly boom 102.

The pair of vertically positioned cylinders 126 and 128 are cooperatively operable to raise and lower second frame member 86 and shank 144 pivotally connected thereto about point 92 by simply acting together to shorten or lengthen the exposed piston rods or shafts 122 and 124 as clamps 134 and 136 maintain cylinder bodies 138 and 140 in a fixed immovable position with respect to first frame member 20. Therefore, when cylinders 126 and 128 are operated together in the same direction, second frame member 86 is raised or lowered as desired. Additionally, cylinders 126 and 128 may be cooperatively operated to rotate second frame member 86 with respect to first frame member 20 about shaft 106. This is accomplished by operating each of the cylinders 126 and 128 in opposite directions, i.e., shaft 122 of cylinder 126 is shortened while at the same time shaft 124 of cylinder 128 is lengthened thus creating a rotational force in a clockwise direction on funnel 96 and boom 102 maintained therein.

It has also been found that a skilled operator can, by the interplay between cylinders 126 and 128, move second frame member 86 laterally with respect to first frame member 20 though this is normally accomplished manually when pin 70 and pin 72 are removed. The shearing force or moment created when cylinders 126 and 128 are operated against one another will cause the connecting members 62 and 64 to slide within channels 48 and 50 depending upon the direction of rotation created by the fluid flow within the cylinders.

The displacement of second frame member 86 by cylinders 126 and 128 regulates the depth at which a cable or conduit 14 is placed within the earth, although, as will be subsequently seen, this factor can be controlled to some extent by the positioning of shank 144 in conjunction with the operation of cylinder 152.

Cylinder 152 which connects boom 102 with the upper end 146 of shaft 144 is similarly operated within the same hydraulic system as was previously described, and it can be seen from FIG. 1 that when piston rod 150 is extended to its furthermost position, shank 144 assumes a substantially vertical position with respect to the ground so as to position the soil-opening shoe formed from burr or tip 158 and lower portion 156 of shank 144 properly to produce a furrow or trench in the most efficient and effective manner. When piston rod 150 is retracted by reversing the fluid flow within cylinder 152, shank 144 will be pivoted about point 142 with respect to boom 102 and assume a different angle therewith.

It is apparent that by the particular operation of cylinders 126 and 128 along with cylinder 152, any number of configurations may be accomplished with the linkages formed by boom 102 and shank 148 with respect to first frame member 20, and the terrain into which cable or conduit 14 is placed would control the particular configuration to be used. Additionally, should the terrain be at an incline, proper operation of cylinders 126 and 128 with boom 102 and its pivotally connected shank 144 would provide sufficient rotation to permit shank 144 to assume a perpendicular position with respect to a true level no matter what inclined position the self-powered vehicle might assume. When the vehicle is being transported from different job sites, it is advantageous and desirable to retract the second frame member structure along with shank 144 so as to bring these components in as closely as possible to the permanent structure of the apparatus 10 to avoid hazardous conditions or subject the structure to any danger from traffic or the conditions of the surrounding area.

The hydraulic system is shown diagrammatically in FIG. 9 wherein a reservoir 216 is provided for the hydraulic fluid. A conduit 218 leads therefrom to the inlet side of pump 220, and a discharge line 222 leads from pump 220 to a plurality of valves 226, 228 and 230. A return conduit 232 returns the hydraulic fluid from valves 226, 228 and 230 to the hydraulic reservoir 216. A branch conduit 234 interconnects conduits 218 and 232 and has a relief valve 236 therein, so upon stoppage of flow of hydraulic fluid through valves 226, 228 and 230, hydraulic fluid will be by-passed through conduit 234 and relief valve 236 into conduit 232 leading to reservoir 216, so as to prevent damage to the conduit or the operating elements.

Valves 226, 228 and 230 are provided with three-position selector levers 238, 250 and 242, which, when held in the vertical position, will hold the hydraulic head against movement in either direction. However, upon shifting these levers into one of the inclined positions, hydraulic fluid will be directed through the various conduits to a selected cylinder and will move the piston or connecting rods 122, 124 and 150 in a particularly desired direction. By moving the particular lever to the opposite position, the fluid flow in the hydraulic line is reversed, and the piston or connecting rods of the particular cylinder involved will be moved outwardly or in the opposite direction. The hydraulic cylinders 126, 128 and 152 are of a construction that they may be held at any set position.

The present invention has been illustrated and described in some detail for one particular embodiment, and the present arrangement is particularly adapted to opening a ditch and laying a cable therein in close proximity to a wall or fence, which will render a cable or conduit less vulnerable to being cut by earth-working machines which are frequently used on highways and streets, where such cable or conduit is most frequently laid. Also, the operation of the device is more flexible and makes possible the laying of cable or flexible conduit formed by the shank shoe along a defined path, which path is not necessarily limited to the actual path of a naturally trailed plow.

Obviously, many modifications and variations may be made in the construction or arrangement of the first and second frame members as well as the configuration of the plow shank and other phases of the present inventive concept in light of the above teachings without departing from the real spirit and purpose of this invention. Such modifications of parts and alternatives as well as the use of mechanical equivalents to those herein illustrated and described are reasonably included and modifications are contemplated.

I claim:

1. An apparatus for laying cable, flexible conduit and like material adapted to be mounted on a self-powered vehicle, said apparatus comprising: a first frame member secured to the vehicle and supporting a revolvable wound supply of material; a second frame member pivotally, rotatably and slidably connected to said first frame member; first piston means operably joining said first and second frame members and upon actuation imparting relative pivotal, rotational and slidable motion between said frame members; a plow shank pivotally connected with said second frame member; second piston means connecting said second frame member and said plow shank and displacing said shank with respect to said first member; and guide means selectively receiving and directing material from the wound supply carried by said first frame member along said plow shank and into a furrow formed by the shank as the vehicle is advanced.

2. An apparatus for laying cable, flexible conduit and like material as set forth in claim 1, said first and second piston means including double-acting fluid-actuated cylinders positioned to permit the selective direction of fluid pressure within said cylinders, pump means to supply fluid pressure selectively to the ends of said cylinders and conduit means communicating with said cylinder ends to selectively direct fluid under pressure thereto and therefrom.

3. Apparatus for laying cable, flexible conduit and like material as set forth in claim 1, said first frame member having a plurality of upstanding substantially vertical struts rigidly spaced from each other by a pair of substantially horizontal connecting members each forming a retaining channel opening rearwardly of said vehicle and slidably receiving said second frame member therein for lateral movement.

4. An apparatus for laying cable, flexible conduit and like material as set forth in claim 1, said second frame member having at least one first frame connecting member slidably engaging said first frame member and a universal connection joining said first and second frame members for circular, pivotal and linear motion each with respect to the other.

5. An apparatus for laying cable, flexible conduit and like material as set forth in claim 1, said plow shank having an upper and lower end and being pivotally connected to said second frame member intermediate its length, said shank having a soil-opening shoe on said lower shank end and movable piston means at said upper shaft end pivoting said shank vertically upon actuation.

6. An apparatus for laying cable, flexible conduit and like material as set forth in claim 1, said guide means including at least one cable-engaging idler secured to said shaft, at least one enclosed cable-receiving channel adjacent said shaft and carried thereby and means to arcuately bend the cable as it emerges from said channel and extends into the formed furrow so as to induce the cable to assume a substantially flat and kink-free position within the furrow.

7. An apparatus for laying cable, flexible conduit and like material as set forth in claim 1, said first piston means including a pair of substantially parallel double-acting fluid-actuated cylinders pivoting, rotating and sliding said second frame member with respect to said first frame member as fluid pressure is selectively directed within said cylinders, and said second piston means including at least one double-acting fluid-actuated cylinder pivoting said shaft vertically with respect to said second frame member.

8. An apparatus for laying cable, conduit and like material as set forth in claim 2, said first frame member having a plurality of upstanding and substantially vertical struts rigidly upheld from each other by substantially horizontal connecting members, at least one of said horizontal members forming a retaining channel opening rearwardly of said vehicle and slidably receiving said second frame member for lateral movement therein, said second frame member having at least one first frame connecting member slidably engaging said first frame member, and a universal connection joining said first and second members for circular, pivotal and linear motion each with respect to the other, said plow shank having an upper and lower ground-engaging end and being pivotally connected to said second frame member intermediate its length, said shank having a soil-opening shoe on said lower shank end and movably connected to said second piston means at said upper shank end so than said second piston means upon actuation will selectively pivot said shank and insert and remove said show from the soil, and said guide means including at least one cable-engaging idler secured to said shank proximate said upper shank end, at least one enclosed cable-receiving channel adjacent said shaft and carried thereby, and means to arcuately bend the cable as it emerges from said channel and extends into the formed furrow so as to induce the cable to assume a substantially flat and kink-free position within the furrow.

9. An apparatus for laying cable, flexible conduit and like material as set forth in claim 7, said first frame member having a plurality of upstanding vertical struts rigidly spaced from each other by substantially horizontal member having at least one first frame connecting members forming a retaining channel opening rearwardly of said vehicle and slidably receiving for lateral movement therein said second frame member, said second frame member having at least one first frame connecting member slidably engaging said first frame member and a universal connection joining said first and second member for circular, pivotal and linear motion each with respect to the other, said plow shank having an upper and lower ground-engaging end and being pivotally connected to said second frame member intermediate its length, said shank having a soil-opening shoe on said lower shank end and movably connecting to said second piston means at said upper shank end so that said second piston means upon actuation will selectively pivot said shank and insert and shank proximate said upper shaft end, at least one encluding at least one cable-engaging idler secured to said shnak proximate said upper shaft end, at least one enclosed cable-receiving channel adjacent said shaft and carried thereby and means to arcuately bend the cable as it emerges from said channel and extends into the formed furrow so as to induce the cable to assume a substantially flat and kink-free position within the furrow.

10. An apparatus for laying cable, flexible conduit and like material as set forth in claim 2, said second frame having at least one first frame connecting member slidably engagaing said first frame member and a universal connection joining said first and second members for circular, pivotal and linear motion each with respect to the other, said plow shank having an upper and lower ground-engaging end and being pivotally connected to said second frame member intermediate its length for vertical movement wtih respect to said second frame member, said shank having a soil-opening shoe on said lower shank end so that said second piston means upon actuation will selectively pivot said shank and insert and remove said shoe from the soil, and said guide means including at least one cable-engaging idler secured to said shank proximate said upper shank end, at least one enclosed cable-receiving channel adjacent said shank and carried thereby and means to arcuately bend the cable as it emerges from said channel and extends into the formed furrow so as to induce the cable to assume a substantially flat and kink-free position within the furrow.

References Cited

UNITED STATES PATENTS

| | | | |
|---|---|---|---|
| 3,060,696 | 10/1962 | Lang | 61—72.6 |
| 3,140,745 | 7/1964 | Hinkle et al. | |
| 3,170,300 | 2/1965 | Kelley | 61—72.6 |
| 3,175,368 | 3/1965 | Tibbits | 61—72.6 |
| 3,232,358 | 2/1966 | Heiberg | 61—72.6 |

FOREIGN PATENTS 536,741    5/1941    Great Britain.

EARL J. WITMER, *Primary Examiner.*